United States Patent [19]
Grathoff

[11] Patent Number: 5,320,471
[45] Date of Patent: Jun. 14, 1994

[54] SUSPENSION AND GUIDE OF A VERTICAL CONVEYOR IN THE DISCHARGE TRUNK OF A SHIP UNLOADER

[75] Inventor: Hartmut Grathoff, Wendelstein, Fed. Rep. of Germany

[73] Assignee: MAN Gutehoffnungshütte Aktiengesellschaft, Oberhausen, Fed. Rep. of Germany

[21] Appl. No.: 967,184

[22] Filed: Oct. 27, 1992

[30] Foreign Application Priority Data

Oct. 28, 1991 [DE] Fed. Rep. of Germany ....... 4135467

[51] Int. Cl.$^5$ .............................................. B65G 67/60
[52] U.S. Cl. ............................... 414/140.9; 414/140.7; 414/140.8; 414/141.4; 414/142.2
[58] Field of Search ............... 414/141.9, 140.7, 140.9, 414/141.3, 141.4, 142.2; 198/518, 626.2, 604, 607, 861.1, 861.6

[56] References Cited

U.S. PATENT DOCUMENTS

| | | | |
|---|---|---|---|
| 3,857,499 | 12/1974 | Harbolt et al. | 414/141.9 |
| 4,284,369 | 8/1981 | Gsponer et al. | 414/140.9 X |
| 4,440,537 | 4/1984 | Blatterman et al. | 414/141.4 X |
| 4,483,655 | 11/1984 | Snow et al. | 414/141.9 X |
| 4,907,932 | 3/1990 | Grathoff | 414/140.9 |
| 5,049,021 | 9/1991 | Pole et al. | 414/141.9 |

FOREIGN PATENT DOCUMENTS

| | | | |
|---|---|---|---|
| 284154 | 9/1988 | European Pat. Off. | 414/140.7 |
| 2813192 | 9/1979 | Fed. Rep. of Germany | 414/142.2 |
| 8128 | 1/1988 | Japan | 414/140.9 |
| 92126 | 4/1989 | Japan | 414/140.9 |
| 623784 | 8/1978 | U.S.S.R. | 198/626.2 |

*Primary Examiner*—Michael S. Huppert
*Assistant Examiner*—Stephen Gordon
*Attorney, Agent, or Firm*—Max Fogiel

[57] ABSTRACT

A continuous-conveyance bulk-cargo ship unloader in which a boom is provided with an elephant trunk that can swing from one end of the boom. The trunk has a hollow cylindrical shaft which accommodates an upright conveyor. At the bottom of the elephant trunk, is a free-sweeping cargo-intake unit that is provided with a cargo pickup, a lower section of the conveyor, and a conveyor loader for transferring cargo from the pickup to the conveyor section. Squeeze rollers are mounted in horizontal frames and positioned at varied heights along the upright conveyor, and these frames have an uppermost frame attached to the shaft. The remaining ones of the frames are suspended from a frame above at three or more points. A lowermost frame is releasably fastened to the cargo-intake unit and pivots along with the cargo-intake unit about a vertical axis at the bottom of the shaft. The trunk is arranged inclined to swing in both directions.

13 Claims, 6 Drawing Sheets

SUSPENSION AND GUIDE OF A VERTICAL CONVEYOR IN THE DISCHARGE TRUNK OF A SHIP UNLOADER

BACKGROUND OF THE INVENTION

The invention concerns a continuous-conveyance bulk-cargo ship unloader. It has a boom. An elephant trunk swings from one end of the boom. The elephant trunk has a hollow cylindrical shaft. The shaft accommodates an upright conveyor. There is a free-sweeping cargo-intake assembly at the bottom of the elephant trunk. The intake assembly comprises a cargo pickup, the lower section of the conveyor, and a conveyor loader that transfers the cargo from the pickup to the conveyor section.

A continuous-conveyance bulk-cargo ship unloader is known from the as yet unpublished German patent application no. 4 125 109.1. At the bottom is a cargo pickup in the form of a scooper head or bucket wheel that rotates around an upright axis.

The cargo pickup transfers the cargo radially to another upright conveyor. The second conveyor can be a belt-sandwich conveyor and more specifically a foam-belt conveyor, a U-section conveyor, or a rippled-edge conveyor. Foam-belt conveyors are described in German Pat. Nos. 2 236 102, 2 333 100, and 2 261 115, U-section conveyors in Swedish Pat. Nos. 705 052-2 and 8 800 315-7, and rippled-edge conveyors in the as yet unpublished German application No. 4 121 996.1.

The screw conveyor and cargo pickup and the opening into the conveyor loader are positioned in relation to the axis of the belt-sandwich conveyor such that all the material will be flung as intended into the throat of the conveyor's intake slot.

The upright section of the belt-sandwich conveyor is inside the elephant trunk.

Belt-sandwich conveyors are upright conveyors that convey a bulk material by compressing it between two belts. At least one belt is driven. If only one is driven, the other is entrained by friction.

To allow flow rates ranging from zero to the maximum possible, the space between the belts must be variable within certain limits. The squeeze rollers, or at least the squeeze rollers resting against one of the belts, the pressure belt, can accordingly be mounted resiliently. Alternatively the pressure belt itself can be resilient, made of foam for example, and travel through a trough between the sets of rollers.

In the section of the conveyor in which the bulk material is conveyed upward, many directly adjacent rollers squeeze the ascending strand of the pressure belt against the ascending strand of the counterpressure belt. The rollers that squeeze the descending strands can be farther apart. The descending strands can also be squeezed by a farther-apart roller or roller trough against one of the rollers or troughs that squeezes an ascending strand.

SUMMARY OF THE INVENTION

The object of the present invention is to improve the conventional upright conveyor accommodated in the hollow cylindrical shaft of the elephant trunk of a continuous-conveyance bulk-cargo ship unloader to the extent that the cargo pickup in the intake assembly at the bottom of the shaft will be able to reach all four corners of the hold without impinging against the edges of the hatchway or the walls of the hold, allowing removal of all the cargo.

This object is attained in accordance with the invention as recited in the claims.

The squeeze rollers are accordingly mounted in horizontal frames positioned at various heights along the upright conveyor. The uppermost frame is attached to the elephant-trunk shaft. Each of the other frames is suspended from the frame above it at three or more points. The lowermost frame is fastened to, can be released from, and pivots along with the intake assembly at the bottom of the shaft. Up-and-down adjustments are possible.

Due to the design of the upright conveyor and to how it is secured in the elephant trunk, the shaft can be made from a single sheet of metal welded into a smooth cylinder of appropriate dimensions instead of latticework. Since the frames that the squeeze rollers are mounted in are accommodated loose inside the cylinder and not fastened to it, the shaft is simpler and less expensive to manufacture.

The upright conveyor inside the shaft of a continuous-conveyance bulk-cargo ship unloader, the boom that pivots up and down on a horizontal axis, the vertical elephant trunk swinging from a horizontal axis at one end of the boom, and the intake assembly comprising a cargo pickup, the lower section of the conveyor, and a conveyor loader that transfers the cargo from the pickup to the conveyor section and sweeping freely around an upright axis at the bottom of the elephant trunk are attached and maneuvered in accordance with the invention as will now be described.

The squeeze rollers are combined into groups. The groups are mounted in horizontal frames. The frames are at various levels. Each lower frame is suspended to the one above it at three or more points. It is suspended by a rod, cable, chain, or similar links articulated to the frames. The articulation can be elastic and allow limited rotation. The lower frames are not rigidly fastened to the shaft but rest radially at three or four points against its inner surface on wheels or spacers for example. The uppermost frame is attached to the shaft. The lowermost frame is fastened to and pivots along with the intake assembly at the bottom of the hollow cylindrical shaft. Up-and-down adjustments are possible to correct for differences in the length of the rotating column of frames. These adjustments are possible because the links between the lowermost frame, which pivots along with the intake assembly, and the next frame up, are tension springs. The uppermost frame can be released from the cylindrical shaft and the lowermost frame from the free-sweeping intake assembly, and the whole column of frames can be extracted from the bottom of the shaft for maintenance and repair.

The intake assembly at the bottom of the hollow cylindrical shaft can freely sweep 60° to 90° in both directions around an upright axis. This measure simplifies transferring the material and eliminates the need for extra drive mechanisms at the transition between the shaft and the boom.

The shaft can be sheet metal. It can be a rectangular prism instead of a cylinder. It can also be latticework with appropriate inner surfaces for the frames' wheels or spacers to travel over.

The upright conveyor can be an in-itself known belt-sandwich conveyor with a foam belt or with an also basically known rippled-edge belt.

BRIEF DESCRIPTION OF THE DRAWINGS

Some embodiments of the invention will now be specified with reference to the schematic drawing.

DESCRIPTION OF THE PREFERRED EMBODIMENTS

Figure 1:
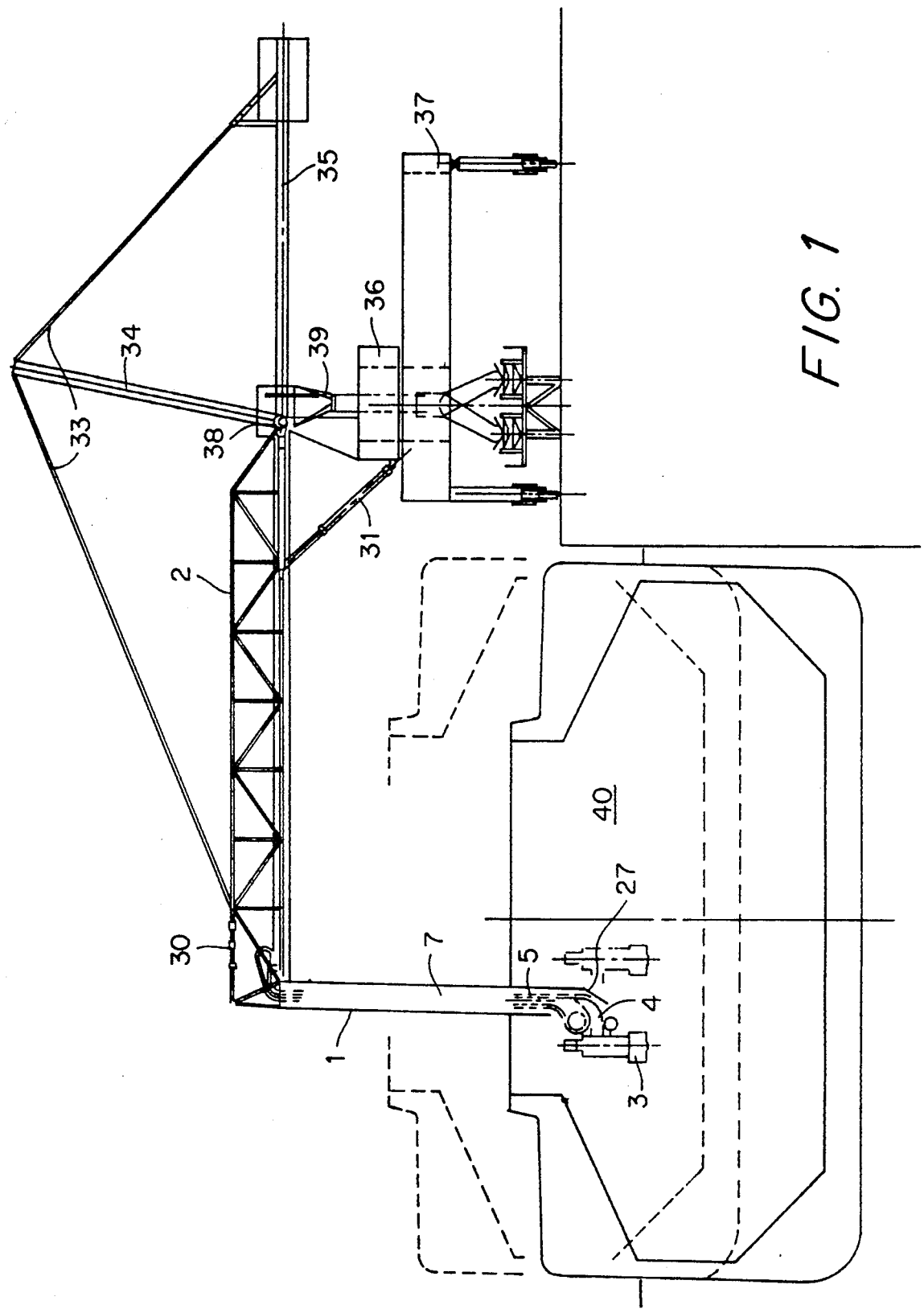
FIG. 1 is a side view of a continuous-conveyance bulk-cargo ship unloader.

FIG. 1 is a side view of a continuous-conveyance bulk-cargo ship unloader. An elephant trunk 1 swings from the end of a boom 2 that is toward the water. The sweep of elephant trunk 1 is controlled by a hydraulic pendulum drive 30. Boom 2 is raised and lowered by a hydraulic rocking drive 31.

Sweeping freely at the bottom of a hollow cylindrical shaft 7 is an intake assembly 27 that variably positions a cargo pickup 3 where it can reach the material to be unloaded.

At the land end the ship unloader comprises a gantry 37 and a turntable 36 that supports a mast 34 and counterweight arm 35. Boom 2 and counterweight boom 35 are stayed to the top of mast 34 by a cable 33. The cylinder that drives the belt-sandwich conveyor is coaxial with main superstructure articulation 38 at the land end of boom 2 and above a hopper 39 for dumping bulk cargo 40.

Figure 2:
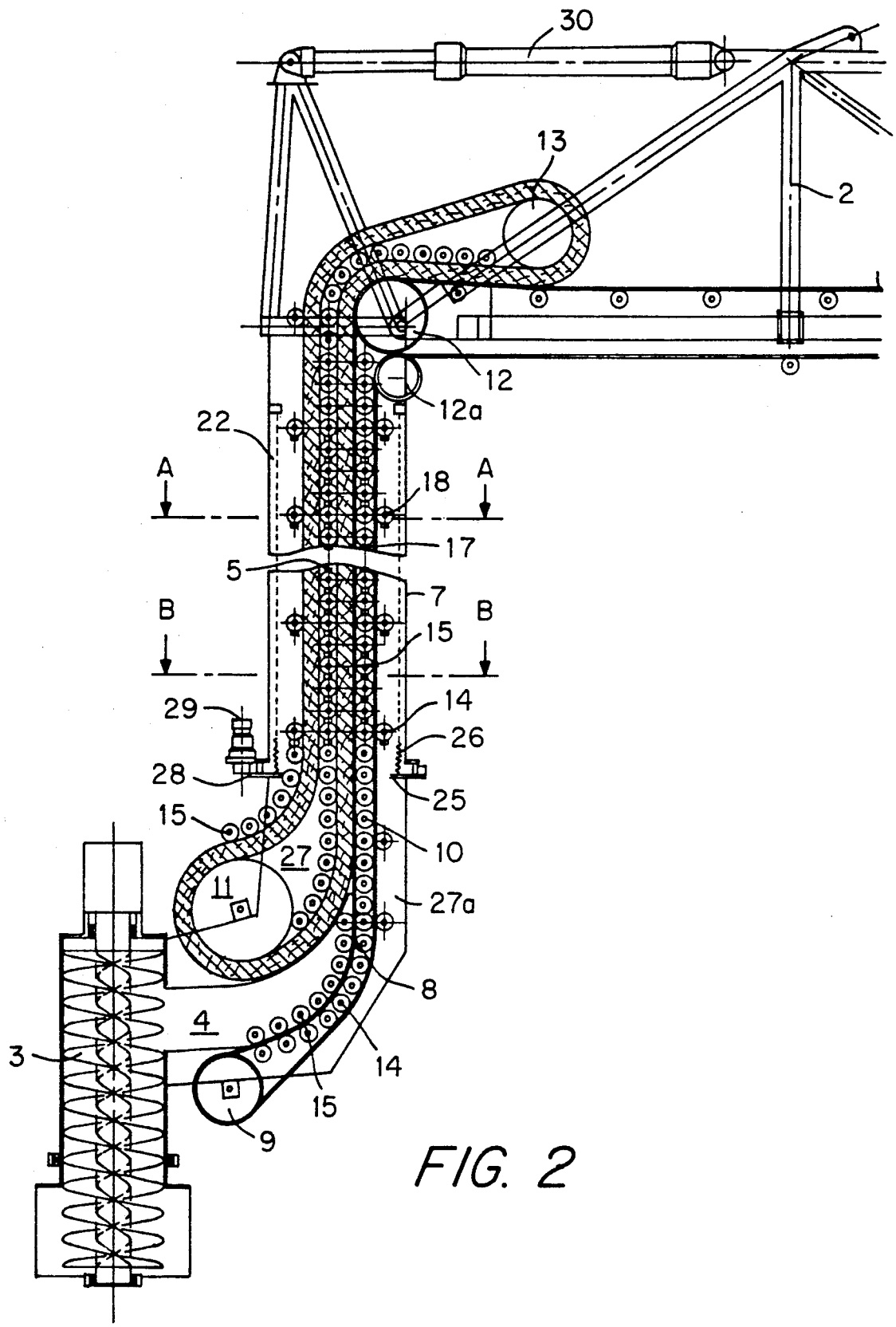
FIG. 2 illustrate's the ship unloader's elephant trunk.

FIG. 2 illustrates a hollow cylindrical shaft 7 and a free-sweeping intake assembly 27.

An upright conveyor, a belt-sandwich conveyor 5 in the present embodiment, includes a pressure belt 10 and a counterpressure belt 8. Pressure belt 10 wraps around one deflection cylinder 13 in boom 2 and around another deflection cylinder 11 in intake assembly 27. Counterpressure belt 8 wraps around deflection cylinders 12 and 12a on boom 2 and around a third deflection cylinder in intake assembly 27.

Intake assembly 27 sweeps along with cargo pickup 3, a conveyor loader 4 that transfers the cargo to belt-sandwich conveyor 5, and deflection cylinders 9 and 11 around a revolving bearing 28. Its motion is controlled by a drive mechanism 29.

Figure 3:
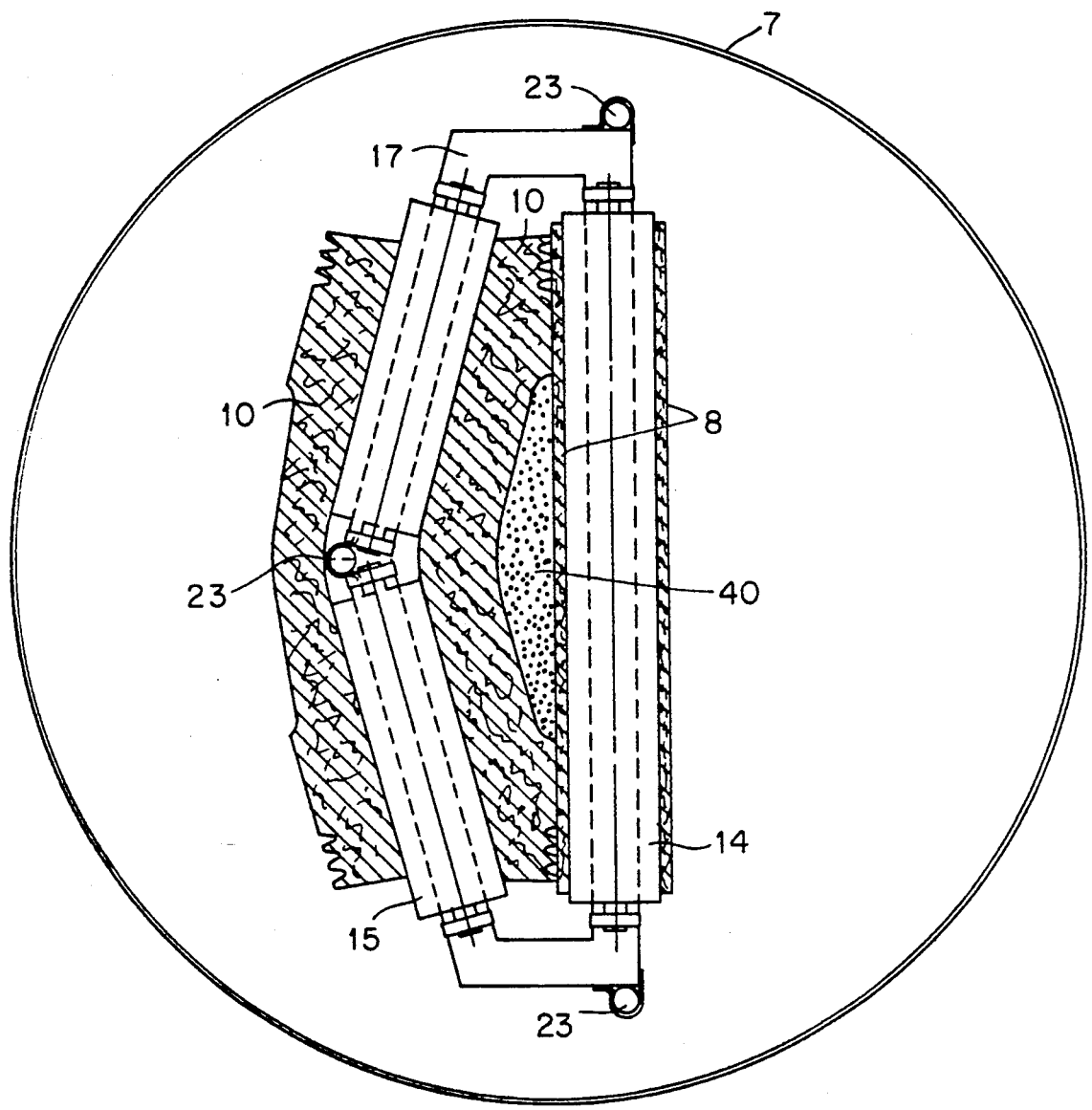
FIG. 3 is a top view of a smaller frame.
Figure 4:
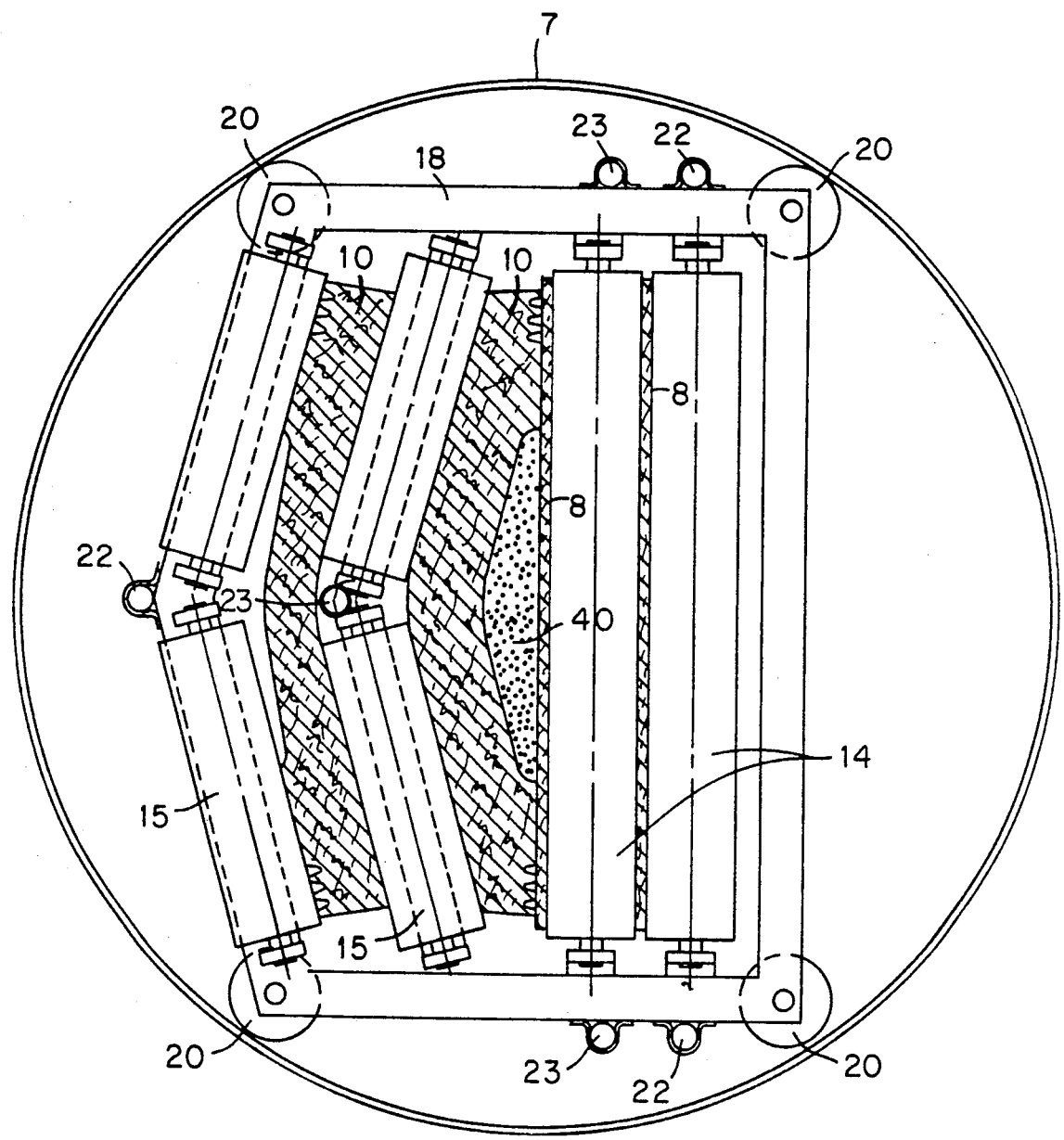
FIG. 4 is a top view of a larger frame.

Belt-sandwich conveyor 5 is positioned by squeeze rollers 14 and 15 mounted in horizontal frames 17 and 18 at various levels along the elephant trunk. The conveyor employs several smaller frames 17 and a few larger frames 18. Each smaller frame 17 accommodates, as illustrated in FIG. 3, a pair of half-length squeeze rollers 15 joined at an obtuse angle to each other and a single full-length squeeze roller 14. Each larger frame 18 accommodates, as illustrated in FIG. 4, two pairs of half-length squeeze rollers 15, the rollers in each pair joined at an obtuse angle to each other, and two full-length squeeze rollers 14. Usually, only the larger frames, frames 18 are employed, resting on spacers or wheels 20 against the inner surface of shaft 7.

Small frames 17, four for example, as illustrated in FIG. 2, can be suspended on continuous chains, cables or similar structures 23 threaded through horizontal eyes in the triangular array illustrated in FIG. 3. Larger frames 18 can be suspended on continuous chains, cables or similar structures 22 threaded through horizontal eyes in the larger triangular array illustrated in FIG. 4. If the smaller array is also provided on the larger frames as illustrated in FIG. 4, both smaller and larger frames 17 and 18 can be suspended in alignment on the same chains, cables, or similar structures 22 and 23 threaded through both arrays of eyes. Alternatively, eyes can be mounted on the top and bottom of each frame and the frames can be suspended from struts extending between the eyes.

The lowermost frame 18 or 19 may be attached to the free-sweeping intake assembly 27 by a resilient element 26 with a fastener 25 on the bottom, as shown in FIG. 2.

Figure 5:
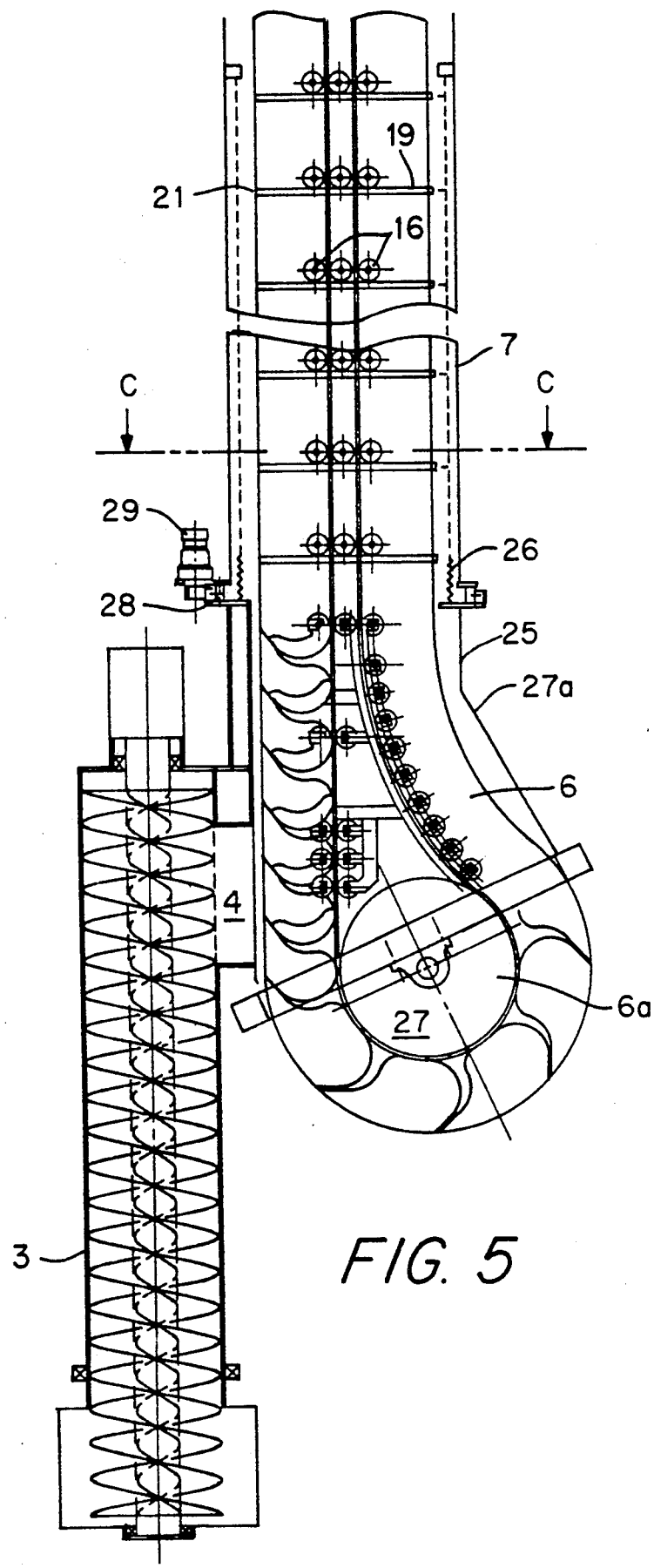
FIG. 5 illustrates an elephant trunk employed with a rippled-edge belt upright conveyor.

The upright conveyor illustrated in FIG. 5 is a known rippled-edge belt conveyor 6 mounted like the belt-sandwich conveyor 5 in a shaft 7.

The intake assembly 27 in this embodiment comprises a housing 27a, a cargo pickup 3, a conveyor loader 4, and the bottom of rippled-edge belt conveyor 6. Conveyor 6 extends between full-length squeeze rollers 14 and fractional-length squeeze rollers 16 and around a deflection cylinder 6a.

All the frames 19 in rippled-edge belt conveyor 6 are, as will be evident from FIG. 5, identical in design and are suspended on three continuous chains or similar structures 21 threaded through them. The upper ends of the chains are secured as hereintofore specified to the top of shaft 7 and their bottom ends as also specified hereintofore to the intake assembly 27 that sweeps freely on the bottom of shaft 7.

Figure 6:
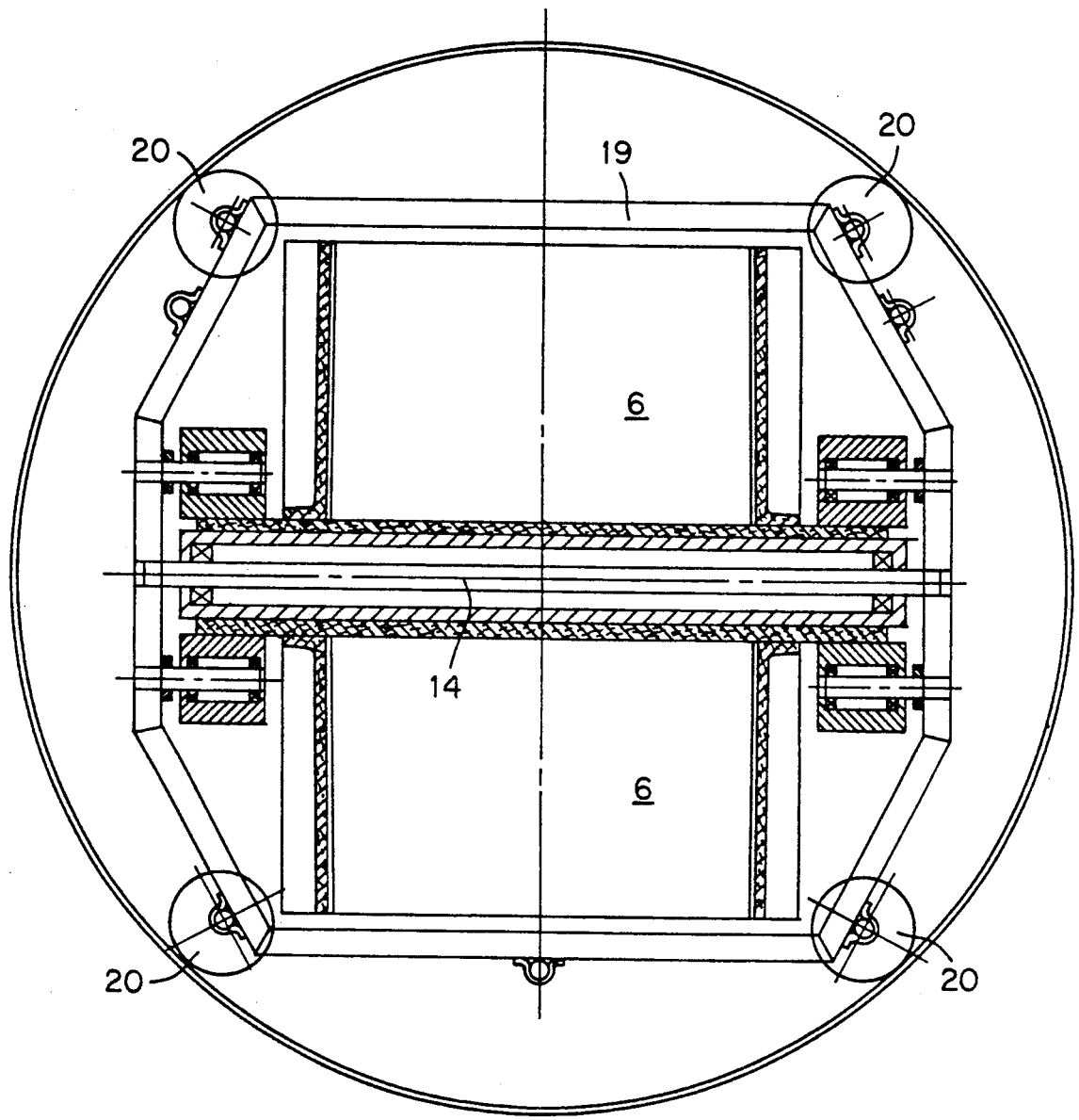
FIG. 6 is a top view of a frame employed with a rippled-edge belt conveyor.

Mounted at the midpoint in each frame 19 is, as illustrated in FIG. 6, a single full-length squeeze roller 14. At each end are two floating fractional-length squeeze rollers 16. These rollers secure both strands of rippled-edge belt conveyor 6 in shaft 7. The shaft 7 in this embodiment is also cylindrical.

List of parts

1. Free-swinging elephant trunk
2. Boom
3. Cargo pickup
4. Conveyor loader
5. Belt-sandwich type upright conveyor
6. Rippled-edge belt type upright conveyor
6a. Rippled-edge belt conveyor lower deflection cylinder
7. Hollow cylindrical shaft
8. Belt-sandwich conveyor counterpressure belt
9. Counterpressure-belt lower deflection cylinder
10. Belt-sandwich conveyor pressure belt
11. Pressure-belt lower deflection cylinder
12. Counterpressure-belt large upper deflection cylinder
12a. Counterpressure-belt small upper deflection cylinder
13. Pressure-belt upper deflection cylinder
14. Counterpressure-belt squeeze rollers
15. Pressure-belt squeeze rollers
16. Fractional-length rollers
17. Belt-sandwich conveyor smaller frames
18. Belt-sandwich conveyor larger frames
19. Rippled-edge belt conveyor frames
20. Spacers or wheels
21. Means of suspending frames in rippled-edge belt conveyor
22. Means of suspending larger frames in belt-sandwich conveyor 23. Means of suspending smaller frames in belt-sandwich conveyor
24. Upper fastener
25. Lower fastener
26. Tension springs
27. Free-sweeping intake assembly
28. Revolving bearing
29. Intake-assembly sweep-drive mechanism
30. Hollow-cylindrical shaft pendulum-drive mechanism
31. Rocking-drive mechanism
32. Belt-sandwich conveyor drive cylinder
33. Staying cable
34. Mast
35. Counterweight boom
36. Turntable
37. Gantry and transport mechanisms
38. Main superstructure articulation
39. Bulk-cargo dumping hopper
40. Bulk cargo

I claim:

1. A continuous-conveyance bulk-cargo ship unloader comprising: a boom with an elephant trunk swinging from one end of said boom; a hollow cylindrical shaft in said elephant trunk; an upright conveyor accommodated by said shaft; free-sweeping cargo-intake means at a bottom of said elephant trunk; said cargo-intake means comprising a cargo pickup, a lower section of said conveyor, and a conveyor loader for transferring cargo from said pickup to said conveyor section; squeeze rollers mounted in horizontal frames and positioned sequentially at varied heights along said upright conveyor; an uppermost one of said frames being attached to said shaft, suspension means for sequentially suspending each of the remaining ones of said frames exclusive of said uppermost frame, from a respective higher positioned frame, at at least three points; a lowermost one of said frames being releasably fastened to said cargo-intake means and pivotable along with said cargo-intake means about a vertical axis at a bottom of said shaft; said trunk being inclined relative to said boom and arranged to pivot both clockwise and counterclockwise about said vertical axis.

2. A continuous-conveyance ship unloader as defined in claim 1, including drive means at said bottom of said shaft for sweeping said cargo-intake means, said upright conveyor, and said frames about a revolving bearing.

3. A continuous-conveyance ship unloader as defined in claim 1, wherein said suspension means comprises continuous cables.

4. A continuous-conveyance ship unloader as defined in claim 1, wherein said suspension means comprises continuous chains.

5. A continuous-conveyance ship unloader as defined in claim 1, wherein said suspension means comprises continuous struts.

6. A continuous-conveyance ship unloader as defined in claim 1, wherein said suspension means comprises elastic means connected to said frames.

7. A continuous-conveyance ship unloader as defined in claim 1, wherein said suspension means comprises articulating means connected to said frames.

8. A continuous-conveyance ship unloader as defined in claim 1, including a resilient element with a fastener, said lowermost frame being attached to said cargo-intake means by said resilient element with said fastener.

9. A continuous-conveyance ship unloader as defined in claim 1, including spacers, said frames resting against said shaft on said spacers.

10. A continuous-conveyance ship unloader as defined in claim 1, including wheels, said frames resting against said shaft on said wheels.

11. A continuous-conveyance ship unloader as defined in claim 1, wherein said upright conveyor comprises a belt-sandwich conveyor, said frames being of different sizes with smaller frames and larger frames, a plurality of said smaller frames holding two sets of squeeze rollers and a plurality of said larger frames holding four sets of squeeze rollers.

12. A continuous-conveyance ship unloader as defined in claim 1, wherein said upright conveyor is detachable from said shaft by fasteners at a level where said conveyor rotates inside said shaft.

13. A continuous-conveyance bulk-cargo ship unloader comprising: a boom with an elephant trunk swinging from one end of said boom; a hollow cylindrical shaft in said elephant trunk; an upright conveyor accommodated by said shaft; free-sweeping cargo-intake means at a bottom of said elephant trunk; said cargo-intake means comprising a cargo pickup, a lower section of said conveyor, and a conveyor loader for transferring cargo from said pickup to said conveyor section; squeeze rollers mounted in horizontal frames and positioned sequentially at varied heights along said upright conveyor; an uppermost one of said frames being attached to said shaft, suspension means for sequentially suspending each of the remaining ones of said frames exclusive of said uppermost frame, from a respective higher positioned frame, at at least three points; a lowermost one of said frames being releasably fastened to said cargo-intake means and pivotable along with said cargo-intake means about a vertical axis at a bottom of said shaft; said trunk being inclined relative to said boom and arranged to pivot both clockwise and counterclockwise about said vertical axis; drive means at said bottom of said shaft for sweeping said cargo-intake means, said upright conveyor, and said frames about a revolving bearing; said suspension means comprising continuous cables; said suspension means comprising elastic means connected to said frames; a resilient element with a fastener, said lowermost frame being attached to said cargo-intake means by said resilient element with said fastener; said frames resting against said shaft on spacers; said upright conveyor comprising a belt-sandwich conveyor, said frames being of different sizes with smaller frames and larger frames, a plurality of said smaller frames holding two sets of squeeze rollers and a plurality of said larger frames holding four sets of squeeze rollers; said upright conveyor being detachable from said shaft by fasteners at a level where said conveyor rotates inside said shaft.

* * * * *